United States Patent

Mensch

[11] Patent Number: 6,062,377
[45] Date of Patent: May 16, 2000

[54] AIR SUPPORTED FLAT BELT CONVEYOR AND METHOD OF CONVEYING ARTICLES

[75] Inventor: William A. Mensch, Farmington, Mich.

[73] Assignee: Jervis B. Webb Company, Farmington Hills, Mich.

[21] Appl. No.: 08/984,507

[22] Filed: Dec. 3, 1997

[51] Int. Cl.[7] ............................. B65G 15/60; B65G 23/18
[52] U.S. Cl. ............................. 198/811; 198/841
[58] Field of Search .................... 198/720, 811, 198/836.1, 837, 818, 841

[56] References Cited

U.S. PATENT DOCUMENTS

| | | |
|---|---|---|
| 756,600 | 4/1904 | Dodge ..................................... 198/811 |
| 3,478,864 | 11/1969 | Hopkins . |
| 3,587,832 | 6/1971 | Robinson et al. . |
| 3,592,334 | 7/1971 | Fleischauer . |
| 3,627,111 | 12/1971 | Hillinger . |
| 3,717,241 | 2/1973 | Arieh . |
| 3,734,271 | 5/1973 | Dolgolenko et al. . |
| 3,744,619 | 7/1973 | Dolgolenko et al. . |
| 3,889,802 | 6/1975 | Jonkers . |
| 4,565,396 | 1/1986 | Larimer ..................................... 294/1.2 |
| 4,674,626 | 6/1987 | Adcock . |
| 4,756,402 | 7/1988 | Bevins ..................................... 198/632 |
| 4,779,718 | 10/1988 | Jonkers . |
| 4,984,681 | 1/1991 | Jonkers . |
| 5,007,528 | 4/1991 | Hideharu ............................. 198/841 X |
| 5,219,064 | 6/1993 | Roman ................................. 198/836.1 |
| 5,829,577 | 11/1998 | Grisley ..................................... 198/811 |

FOREIGN PATENT DOCUMENTS

| | | |
|---|---|---|
| 2 086 154 | 12/1971 | France . |
| 964 482 | 5/1957 | Germany . |
| 1 806 865 | 6/1969 | Germany . |
| 1 236 866 | 6/1971 | United Kingdom . |

OTHER PUBLICATIONS

"Mechanical Conveyor Operates Well In Harsh Conditions", reprinted from Powder and Bulk Engineering, Nov. 1990.
Airbelt Incorporated Brochure entitled "Air Supported Belt Conveyors", 1995.

Primary Examiner—Christopher P. Ellis
Assistant Examiner—Gene O. Crawford
Attorney, Agent, or Firm—Dickinson Wright PLLC

[57] ABSTRACT

An air supported conveyor, particularly adapted for conveying articles such as baggage or packages at a high rate of speed includes a plenum chamber and a belt support containing a plurality of orifices. Air or another pressurized fluid is supplied to the plenum chamber to provide a clearance or air bearing between the belt and the support during belt travel. The belt support has a generally flat center section with outer sections that curve or angle upwardly. Guides are mounted adjacent the angled outer sections. Disposed along the length of the belt and between an underside of each guide and the angled outer belt sections are elongated members. Each elongated member in conjunction with each guide underside and belt support acts as a belt edge guide by forming a recess which receives the belt edges during belt travel. Each recess directs air from the belt underside up and around the belt side edge, across the upper surface of the belt and out a slot egress. The recess assists in creating a pressure against the upper surface of the belt in the guide underside vicinity, thereby minimizing or eliminating belt contact with the guide underside and potential belt wear or damage with high speed belt travel.

22 Claims, 2 Drawing Sheets

AIR SUPPORTED FLAT BELT CONVEYOR AND METHOD OF CONVEYING ARTICLES

FIELD OF THE INVENTION

The present invention is directed to an air supported flat belt conveyor and a method of conveying articles and, in particular, to a conveyor employing a belt edge guide and belt support configuration which permits flat belt conveying and aids in controlling lateral belt and upward belt edge movement.

BACKGROUND ART

In the prior art, various types of conveyors have been proposed for material handling. One type of a conveyor uses a combination of an endless belt and a series of idler rolls for belt support. This type of conveyor is used in many types of material handling, including both bulk materials and articles such as baggage and packages. When conveying bulk materials, the idlers may be configured to form a troughed idler conveyor in order to keep the bulk material on the belt during its travel. For items such as baggage and packaging, the conveyor belt can be relatively flat.

Conveyor systems employing idler rolls are not without their disadvantages since they can be quite expensive and high in maintenance. These systems are also noisy and require substantial support structures given the large number of idlers which must be used to support the conveyor belt. Conveyors employing idlers also have a high power consumption due to the mass of the idlers and their friction component.

In an effort to eliminate the use of idler rolls and their drawbacks, belt conveyors have been developed which are supported by air rather than a plurality of idlers. U.S. Pat. No. 3,734,271 to Dolgolenko et al. and U.S. Pat. No. 4,984,681 to Jonkers exemplify conveyor systems using air for conveyor support.

Referring now to FIG. 1, an exemplary air supported conveyor is designated by the reference numeral 10 and includes a conveyor frame 1 supporting a plenum chamber 3. A blower 5 draws air into the plenum chamber 3 and forces it through an orifice 7.

The plenum 3 has a troughed-shaped surface 8 which, with the cushion of air supplied by the blower 5, forms a support for the conveyor belt 9. The conveyor belt 9 follows the contour of the trough-shaped surface 8. Bulk material 11 is shown retained by the conveyor belt 9 for conveying from one location to another. FIG. 1 also illustrates a return conveyor 13 wherein the belt 9 is supported by a plurality of idler rolls 15.

The trough-shaped surface 8 serves as a belt alignment means or guide. With the trough-shape, the bulk material tends to migrate towards the longitudinal axis of the conveyor belt 9, thereby keeping the belt 9 within the trough during belt travel.

Air supported conveyors are not without their own disadvantages. Due to the trough-shaped belt, these types of conveyors are not very adaptable for conveying certain types of articles, e.g., baggage or packaging, that are better suited to travel on a flat conveyor. In addition, even though the conveyor 10 uses an air supported system for the conveying of the bulk material 11, idler rolls are still used in the return conveyor system 13. Thus, the problems noted above with idler rolls are still present in the air supported belt conveyor 10 of FIG. 1.

In view of the disadvantages of prior art conveyor systems as noted above, a need exists to provide an improved conveyor system which overcomes the drawbacks of the prior art. In response to this need, the present invention provides an improved conveyor system and method of article conveying which uses an air supported conveyor belt and a unique belt edge guide system which enables conveying articles on a generally flat belt at high speeds.

SUMMARY OF THE INVENTION

Accordingly, it is a first object of the present invention to provide an improved air supported flat belt conveyor.

Another object of the present invention is to provide an air supported belt conveyor especially adapted for conveying articles in an intermittent manner.

A still further object of the present invention is to provide a method of conveying articles using an air supported conveyor.

One other object of the present invention is to provide a conveyor especially adapted to convey articles at high speed while minimizing wear on the conveying belt.

Another object of the present invention is the utilization of a belt edge guide which aids in guiding the belt both laterally and vertically during belt travel.

Other objects and advantages of the present invention will become apparent as a description thereof proceeds.

In satisfaction of the foregoing objects and advantages, the present invention is an improvement over conventional air supported belt conveyors having a belt, a belt support, a belt drive and a source of pressurized fluid supplying fluid to an underside of the belt for support thereof as it travels along the belt support. According to the invention, the air supported conveyor described above includes a belt support having a generally flat center section disposed between angled outer sections. A guide structure is mounted above each angled outer section. An elongated member is disposed between each guide structure and each angled outer section, each of the elongated members, angled outer sections and guide structures forming a recess sized to receive a side edge portion of the belt. The recess directs at least a portion of the fluid originating from under the belt across an upper surface of the belt. The recess can also be configured to create a rise in pressure in a zone above the belt edge and to direct the passing air towards a conveyor longitudinal axis via a slot. The pressure rise assists in controlling the upward movement of the belt, particularly when the belt may have areas of open space. These areas of the belt can be susceptible to upward movement as a result of air being supplied beneath the belt in areas where the belt lacks loading, i.e., no articles or the like.

In a preferred embodiment, an underside of the guide and the belt support are angled with respect to each other, thereby minimizing the slot dimensions and further increasing the pressure in the recess. The belt support is preferably constructed as a plenum chamber with an orifice-containing top plate acting as the belt support. The plenum chamber can include one or more upstanding ribs for structural support.

The elongated member is preferably in the form a bar disposed between the belt support and the guide structure. The bar acts not only as a seal to maintain the integrity of the recess but also as a belt edge face guide to assist in belt steering. The bar can have a low friction surface where contact occurs between the bar and the belt, preferably a Teflon® coating. The bar is attached to one of the guide structure, belt support or another support structure. The guide structure can also include an upstanding surface to act as a guide and/or barrier for articles traveling on the belt.

The invention also comprises an improved way of transporting or conveying articles on a traveling belt supported by a cushion of air. According to the invention, the air supported belt is configured to follow the contour of a belt support having a generally flat center section and angled outer sections. At least a portion of the air being directed under the belt for belt support is directed around side edges of the belt and across an upper surface of the belt. During this air direction step, the air pressure is increased in a zone above the upper surface of the belt to assist in controlling upward displacement of the belt. The air then egresses to atmosphere. In a preferred embodiment, the air is directed towards a longitudinal axis of the belt when passing over the upper surface.

The method is especially adapted to convey articles such as baggage or packages and has the ability to convey these items in a continuous stream wherein the belt is uniformly loaded along its length or in an intermittent fashion wherein the belt has open spaces where no load is applied thereto. When conveying the articles, an air cushion or air bearing is maintained between the belt support and the belt to handle the conveying load. In a preferred mode, the air bearing is less than 0.020 inches, preferably less than 0.010 inches, and more preferably between about 0.004 and 0.006 inches. Other air bearings can be employed depending on the articles to be conveyed.

The inventive conveyor can utilize the air support system as both a feed conveyor and a return conveyor if so desired. Alternatively, a conventional idler roll conveyor could be employed as part of the conveyor return.

BRIEF DESCRIPTION OF THE DRAWINGS

Reference is now made to the drawings of the invention wherein.

DESCRIPTION OF THE PREFERRED EMBODIMENTS

The inventive air supported belt conveyor provides significant improvements over prior art designs using either idler rolls or trough-shaped conveyor configurations. With the inventive conveyor, the increased maintenance requirements due to the presence of idler rolls are minimized or eliminated. In addition, elimination of the idler rolls also results in fabrication of a simpler structure. With a simpler structure to fabricate, the overall system takes less time to erect in a field installation, thereby contributing to reduced capital costs. Further, the absence of the idler rolls results in the elimination of the alignment procedures which must be utilized in prior art conveyor systems.

The inventive conveyor is safer than prior art systems through the elimination of pinch points which are present in conveyor systems using idler rolls. With this safety improvement, it may also be possible to eliminate pull cord switches along the conveyor, thus contributing another economic advantage.

Operating costs are improved with the inventive conveyor since less power is needed to drive the conveyor belt. In conveyor systems using idler rolls, their mass and friction component contribute greatly to the conveyor power consumption. Through the elimination of idler rolls, the overall conveyor drive force power is reduced, even with the existence of a blower or the like to supply the air for conveyor belt support.

The conveyor of the invention is also effective as a high-speed conveyor, e.g., speeds in excess of 2,000 feet per minute, particularly when the conveyor may have open spaces therealong. Open spaces occur due to the conveyance of articles which may be spaced apart or fed to the conveyor in an intermittent fashion. The inventive conveyor has a generally flat belt configuration which is ideal for conveying articles such as baggage, packages or the like. Features of the inventive conveyor permit air support of the generally flat conveyor without loss of control over the lateral movement of the conveyor as it travels or without excessive wear which could result during high speed operation.

Figure 1:
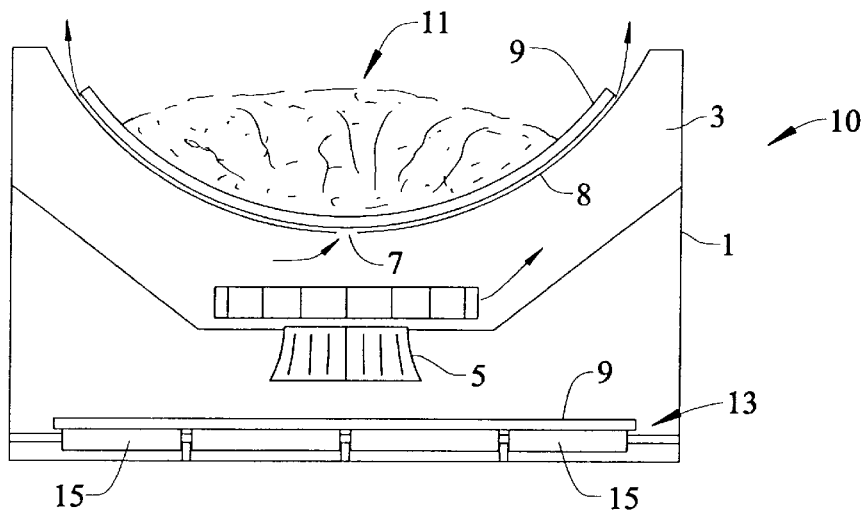
FIG. 1 is a schematic view of a prior art air supported belt conveyor.
Figure 3:
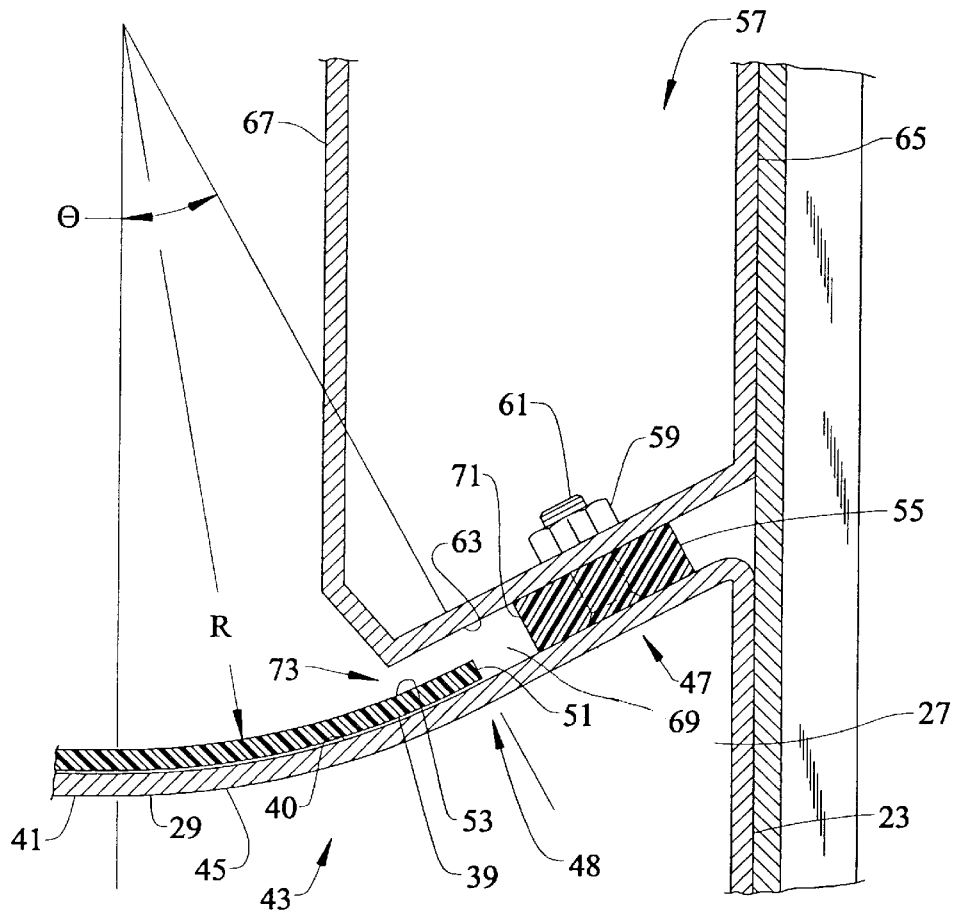
FIG. 3 is a cross sectional view along the line III—III of FIG. 2.
Figure 2:
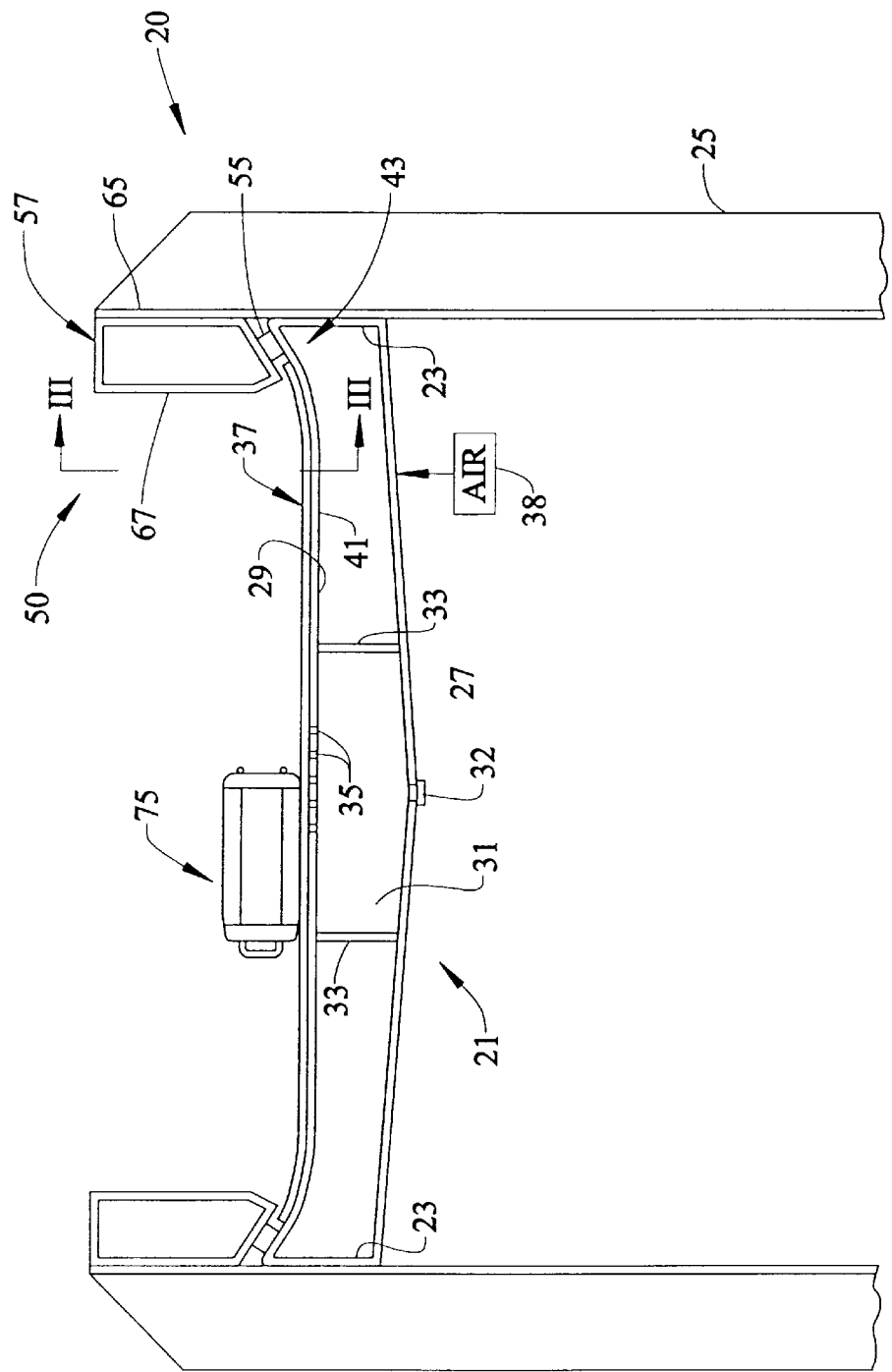
FIG. 2 is a schematic end view of one embodiment of the inventive apparatus.

An exemplary embodiment of the inventive conveyor is depicted in FIGS. 2 and 3 and is designated by the reference numeral 20. The conveyor 20 includes a plenum chamber 21 having opposing ends 23. The plenum chamber 21 is supported via the ends 23 by support members 25. The support members 25 position the plenum chamber 21 at the proper elevation so that the conveyor can interface with the appropriate feed and exit arrangements (not shown). The support members 25 are shown as beams but any structural member or arrangement can be utilized to support the plenum chamber 21.

The plenum chamber 21 includes a bottom plate 27 and a top plate 29, these plates together with the sides 23 forming an interior 31. Strengthening ribs 33 can be positioned in the interior 31 where appropriate to provide additional support.

The bottom plate 27 is shown with an incline toward the longitudinal axis of the conveyor. A drain plug 32 is located at a midpoint of the bottom plate 27 to facilitate removal of accumulated moisture or other unwanted materials. Of course, other configurations of the plenum chamber 21 can be utilized provided that the interior 31 can be pressurized to provide the air support for the conveyor belt.

Still referring to FIGS. 2 and 3, the top plate 29 contains a plurality of orifices 35. The orifices 35 can be slots, round holes or the like and can be distributed as shown or be positioned in other configurations, uneven spacings, etc. A belt 37 is positioned adjacent the top plate 29. The top plate 29 functions as a support for the belt 37 in two modes. First, when the interior 31 is not pressurized by a source of air 38, such as a fan, blower or the like, the belt 37 rests on the plate 29. When the interior 31 is pressurized, air flows through the top plate orifices 35 and against the underside 39 of the belt 37. The air flow creates an air bearing or cushion of air of a given thickness to support the belt 37 while it is driven by a belt drive (not shown) for article conveying. The belt drive is conventional and a further description thereof is not deemed necessary for invention understanding.

More specifically, air or any pressurizable fluid is pumped into the interior 31 from a simple low horsepower centrifugal fan or any air moving device. The air escapes through the series of orifices at or near the longitudinal axis of the conveyor. The air spreads out width-wise and lifts the belt 37 off the top surface 40 of the top plate 29. At the same time, the belt is propelled by a conventional drive system. Air is pulled along with the belt at approximately the same speed as the belt is driven. Air escapes along the belt side edges and at the entrance and exit ends of the conveyor. Air escapes more so at the exit end rather than the entrance end since the travel of the belt draws air with it.

The top plate 29 is divided into three sections, a center generally flat section 41 and opposing outer sections 43, each angled or bent upwardly from the flat plane defined by the center section 41, see FIG. 2.

The outer section 43 is illustrated in FIG. 3 as having a transition section 45 with a radius "R" and a generally straight section 47. The transition section 45 functions to bend the belt slightly or give it a steering action.

The outer section 43 besides being defined by the radius "R" is also defined by the angle "θ". The bend or radius can vary depending on the particular conveyor application, e.g., from a tight bend when the radius is near zero to a gradual bend when the radius could be up to 20 inches. A preferred radius range is between 5 and 10 inches and more preferably 5 and 7 inches, e.g., 6.5 inches. Similarly, the angle "θ" could vary as well, ranging up to 60°, preferably 25° to 35°, and more preferably 30°. The straight section 47 is shown being basically coincident with an exit angle defined by the end portion 48 of the transition section 45. However, the section 47 could be angled with respect to the end portion 48 of the transition section 45, if so desired.

Besides providing a steering action to the belt 37, the angle or curved outer section 43 of the top plate 29 also functions as part of a belt edge guide designated by the reference numeral 50, see FIG. 2. The belt edge guide 50 assists in controlling belt steering or lateral movement and belt upward or vertical movement during belt travel.

The belt edge guide 50 functions to direct air emerging from the underside 39 of the belt 37, around the belt edge face 51 and across the upper belt surface 53. As described in more detail below, the belt edge guide 50 also creates a zone of increased pressure over the belt upper surface 53 to control belt edge upward movement, particularly when the belt may have open spaces, i.e., spaces where no articles are being carried or a no loading situation.

With specific reference to FIG. 3, the belt edge guide 50 includes an elongated bar 55 running generally parallel with the axis of the conveyor 20. The bar 55 is positioned between a guide 57 and the straight section 47 of the top plate 29. In FIG. 3, the bar 55 is shown secured to the guide 57 by the nut 59 and bolt 61 arrangement, the nut 59 extending through openings in the bar 55 and the guide underside 63. The guide 57 is shown supported by the member 25 at reference numeral 65. The guide 57 can also function with its upstanding surface 67 as a guide surface for an article 75 being conveyed on the belt 37, see FIG. 2.

The arrangement of the bar 55, the guide 57 and the top plate 29 create a zone of high pressure over the belt surface 53. More particularly, air exiting from the underside 39 of the belt enters a recess 69 formed by the top plate 29, the underside 63 and the elongated bar face 71. The air, after entering the recess 67, passes over the upper surface 53 of the belt and out a slot 73. By reason of the reduced dimensions of the slot 73 as compared to the recess 69, a zone of higher pressure, e.g., greater than ambient pressure, is created above the belt surface 53. This zone of high pressure tends to force an edge portion of the belt toward the top plate 29. Thus, contact between the belt surface 53 and the underside surface 63 of the guide 57 is minimized or eliminated. This action is extremely significant when the belt is traveling at high speeds, greater than a 1,000 feet per minute and as high as about 2,200 feet per minute. Contact between the surfaces 53 and 63 at these high speeds could cause significant damage to the belt surface.

In addition, since the conveyor 20 may be adapted to carry packages or luggage, see FIG. 2, the belt 37 may see open spaces where the belt is not uniformly loaded. Under these conditions, a tendency exists for the air bearing, i.e., the distance between the underside the belt 39 and the top surface 40 of the top plate 29, to increase and force the belt upwardly, including the belt edge surface 53. With the edge guide 50, air escaping from the sides of the belt is used to control and/or minimize upward belt edge movement. Consequently, the belt can be operated with intermittent article conveyance and, if desired, at high speeds without belt surface damage.

To further enhance the zone of increased pressure, the underside surface 63 of the guide 57 can be bent or angled differently from the angle created by the straight section 47 or angles tangent to the transition section 45. When measured in either way, the difference in angling whereby the acute angle formed by surface 63 and a reference plane bisecting the flat section 41 of the top plate 29 would be greater than that formed by the straight section or tangents to the transition section 45 with respect to the same reference plane. The angling difference between the underside surface 63 and the tangents of the transition section 45 or straight section 47 serves to reduce the slot dimension 73 so that the zone of pressure in recess 69 is increased over a configuration wherein a relationship between the guide surface 63 and straight section 47 or tangents to section 45 is generally parallel.

It should be understood that the design of the belt edge guide 50 is exemplary. Any configuration or means which would direct air from under the belt 37, around the belt edge face 51 and over its upper surface 53 to create the increased pressure zone can be utilized. For example, the guide undersurface 63 could be separate from the guide 57, particularly when the upstanding vertical guide surface 67 would not be needed, e.g., utilizing the conveyor 20 for both conveying articles, e.g., a feed run conveyor, and as a return conveyor. Using the conveyor 20 for the both conveying articles and as a return conveyor overcomes the disadvantages noted above in trough-shaped air supported belts when the return conveyor uses conventional idler rolls.

To enhance the steering action of the belt 37, the bar 55 can use a low friction material on its face 71. This material reduces the friction when the belt edge face 51 may contact the bar face 71. The low friction material can be either a coating, a removable attachment or any other type of configuration which can be interfaced with the bar 55. Preferably, the low friction material is a fluorocarbon polymer such as Telflon®, as a coating or the like. The entire bar can be coated if desired.

The bar 55 can take other forms providing that a seal or the like is maintained to assure creation of the zone of high pressure. The bar 55 could also be attached to the straight section 47 or another and separate support, if so desired. The bar 55 could also be made as a integral or non-removable component of either the guide 57 or the plenum chamber 21.

While the slot dimensions 73 can be altered by changing the relationship between the guide undersurface 63 and the top plate 29, other means or devices could be used to adjust the slot dimension, e.g., inserts attachable to the guide 57, protruding lips or any other structure which will create the desired increase in pressure over the upper surface of the belt 37.

In the method aspect of the invention, the conventional air supported belts are improved by arranging the belt to follow a contour of a belt support having a generally flat center section and angled outer sections. With this configuration, a portion of the pressurized fluid used to support the belt is directed around side edges of the belt and along an upper surface of the belt. With the appropriate configuration in the vicinity of the belt edge, a zone of increased pressure is created over the belt upper surface to assist in controlling belt edge upward movement.

Generally, it is desired to create an air bearing or cushion of up to about 0.02 inches in thickness. More preferably, the air cushion can be less than 0.010 inches or range between 0.004 and 0.006 inches. Of course, the target air bearing may vary depending on the loads intended for conveying. Generally, 14 to 16 inches of water as fan pressure is desired with six cubic feet per minute of air being supplied per lineal foot of conveyor. Again, these values may vary depending on the conveyor application. The calculations necessary to determine optimum air bearing clearances, air pressures and air volumes are well within the skill of the artisan. Similarly, the power requirements for driving the conveyor and supplying the desired volume of air can be calculated by one skilled in the art.

A typical conveyor could utilize a 42" wide conveyor belt, an air bearing of between about 0.004 and 0.006 inches and be specially adapted to carry baggage or packages at a high rate of speed, e.g., more than 2,100 feet per minute.

As such, an invention has been disclosed in terms of preferred embodiments thereof which fulfills each and every one of the objects of the present invention as set forth above and provides a new and improved air supported belt conveyor and a method of article conveying.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. In an air supported belt conveyor apparatus having a belt, a belt support, a belt drive and a source of pressurized fluid supplying fluid to an underside of the belt for support thereof as it travels along the belt support, the improvement comprising:

a) a belt support having a generally flat center section disposed between belt support outer sections, each outer section angled upwardly from the generally flat center section and connected to the generally flat center section by a transition section having a radius;

b) a guide mounted above each angled outer section;

c) an elongated member disposed between each guide member and each angled outer section each elongated member adjacent a side wall of a support structure of the apparatus, each of the elongated members, angled outer sections and guides forming a recess sized to receive an end portion of the belt, each recess sized to direct at least a portion of the fluid originating from under the belt, around a belt edge, and across upper surfaces of each of the end portions of the belt.

2. The apparatus of claim 1, wherein the outer section and an underside of the guide are acutely angled with respect to a surface of the center section, the acute angling of the guide underside being greater than the acute angling of the outer section.

3. The apparatus of claim 1, wherein each guide has an upstanding side surface facing toward a longitudinal axis of the belt.

4. The apparatus of claim 1, wherein the elongated member is a bar mounted between the belt support and the guide.

5. The apparatus of claim 4, wherein at least one side of the bar has a low friction material surface.

6. The apparatus of claim 5, wherein the low friction material is a fluorocarbon polymer.

7. The apparatus of claim 1, wherein the belt support further comprises a plenum chamber arranged beneath a belt support plate, the belt support plate including a plurality of orifices to direct the pressurized fluid contained in the plenum chamber against an underside of the belt.

8. The apparatus of claim 7, wherein the plenum chamber includes a plurality of longitudinally aligned vertical stiffening ribs.

9. The apparatus of claim 7, comprising plenum supports arranged at opposite sides of the plenum chamber.

10. The apparatus of claim 9, wherein the plenum supports support the guides.

11. In a method of conveying at least one article using a belt supported by pressurized fluid directed against a belt underside, the improvement comprising:

a) arranging the belt to follow a contour of a belt support having a generally flat center section disposed between radiused transition sections, and angled outer sections, each angled outer section extending from a respective radiused transition section;

b) directing a portion of the pressurized fluid from under the belt, around side edges of the belt and along upper surfaces of end portions of the belt while supporting the belt with the pressurized fluid for article conveying and creating a zone of increased pressure against each belt side edge, the radiused and angled outer sections and zone steering the belt during belt travel.

12. The method of claim 11, wherein the belt conveys at least one of luggage and packages.

13. The method of claim 11, wherein the pressurized fluid directed across the upper surface travels in a direction generally transverse to a direction of belt travel.

14. The method of claim 11, wherein the belt is driven at speeds in excess of 2000 feet/min.

15. The method of claim 11, wherein the belt is endless to have a feed run and a return run, each run utilizing steps (a) and (b).

16. The method of claim 15, wherein the pressurized fluid directed across the upper surface of the belt travels in a direction generally transverse to a direction of belt travel.

17. The method of claim 11, wherein the belt is supported by an air bearing of less than 0.020 inches.

18. The method of claim 17, wherein the air bearing ranges between about 0.004 and 0.006 inches.

19. In an air supported belt conveyor apparatus having a belt, a belt support, a belt drive and a source of pressurized fluid supplying fluid to an underside of the belt for support thereof as it travels along the belt support, the improvement comprising:

a) a belt support having a generally flat center section disposed between belt support outer sections, each belt support outer section angled upwardly from the generally flat center section and connected to the generally flat center section by a transition section having a radius; and b) means for steering the belt by directing a portion of the pressurized fluid from under the belt, along the transition sections and belt support outer sections, through a recess adjacent side edges of the belt and along upper surfaces of end portions of the belt while supporting the belt with pressurized fluid for article conveying and creating a zone of increased pressure along each side edge of the belt to control lateral travel of the belt.

20. The apparatus of claim 1, wherein the conveyor apparatus has a feed run and a return run, each run including (a), (b) and (c).

21. The apparatus of claim 19, wherein the means for directing and creating further comprise a guide mounted above each angled outer section and a seal disposed between each guide and each angled outer section, each of the seals, angled outer sections and guides forming a recess sized to receive an end portion of the belt, the recess directing at least a portion of the fluid originating from under the belt across an upper surface of the belt and creating the increased pressure zone.

22. The apparatus of claim 21, wherein the outer section and an underside of the guide are acutely angled with respect to a surface of the center section, the acute angling of the outer section being less than the acute angling of the guide underside.

* * * * *